(12) United States Patent
Zanzot et al.

(10) Patent No.: US 8,616,444 B2
(45) Date of Patent: Dec. 31, 2013

(54) AUTHORIZING FINANCIAL TRANSACTIONS

(75) Inventors: Mark D. Zanzot, Huntersville, NC (US); Tony England, Tega Cay, SC (US); Christopher R. Griggs, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 136 days.

(21) Appl. No.: 13/235,811

(22) Filed: Sep. 19, 2011

(65) Prior Publication Data
US 2013/0068835 A1 Mar. 21, 2013

(51) Int. Cl.
*G06K 5/00* (2006.01)
(52) U.S. Cl.
USPC ........... 235/380; 235/375; 235/449; 455/557; 455/558
(58) Field of Classification Search
USPC ......... 235/375, 379, 380, 487, 492, 382, 449, 235/493; 455/406, 407, 557, 558
See application file for complete search history.

(56) References Cited

U.S. PATENT DOCUMENTS

| | | | |
|---|---|---|---|
| 7,066,382 B2 | 6/2006 | Kaplan | |
| 7,841,539 B2 | 11/2010 | Hewton | |
| 8,056,802 B2 | 11/2011 | Gressel et al. | |
| 8,136,732 B2 | 3/2012 | Narendra et al. | |
| 8,430,308 B2 | 4/2013 | Zanzot et al. | |
| 2003/0083042 A1* | 5/2003 | Abuhamdeh | 455/406 |
| 2006/0213973 A1 | 9/2006 | Chan et al. | |
| 2009/0292641 A1* | 11/2009 | Weiss | 705/66 |

OTHER PUBLICATIONS

Citi, "Rewards Just Got Even More Rewarding," Introducing the new Citi 2G Cards, 2011, 1 page, http://creditcards.citicards.com/usc/10/2g/ph1/default.htm?BT_TX=... Printed Sep. 26, 2011.
Dynamics Inc., "Dynamic Credit Card," 2 pages, printed Sep. 26, 2011, http://www.poweredcards.com/products_dynamic_cc.php.
Dynamics Inc., "Hidden," 1 page, printed Sep. 26, 2011, http://www.poweredcards.com/products_hidden.php.
Dynamics Inc., "MultiAccount," 1 page, printed Sep. 26, 2011, http://www.poweredcards.com/products_multi.php.
Dynamics Inc., "Redemption," 1 page, printed Sep. 26, 2011, http://www.poweredcards.com/redemption.php.
Bank of America, "SafePass: Online Banking Security Enhancements," 2 pages, printed Sep. 26, 2011, http://www.bankofamerica.com/privacy/index.cfm?template=learn_a....
Bank of America, "ShopSafe Service," 1 page, printed Sep. 26, 2011, http://www.bankofamerica.com/privacy/index.cfm?template=learn_a....
Mark D. Zanzot et al., "Authorizing Financial Transactions," U.S. Appl. No. 13/235,861, filed Sep. 26, 2011, 29 pages (0689).
Office Action Summary issued by the USPTO for U.S. Appl. No. 13/235,861, filed Sep. 19, 2011 for Inventor: Mark D. Zanzot.

\* cited by examiner

*Primary Examiner* — Michael G Lee
*Assistant Examiner* — Tabitha Chedekel
(74) *Attorney, Agent, or Firm* — Michael A. Springs

(57) ABSTRACT

A system for authorizing a financial transaction includes a processor operable to execute an application on a wireless communications device that is communicatively coupled to a data stripe through a wired connection, receive a request to authorize a financial transaction involving a financial account associated with account data, access authorization criteria for determining whether to authorize the financial transaction, apply the authorization criteria to the financial transaction, generate an authorization code based on the application of the authorization criteria to the financial transaction, and communicate the authorization code.

26 Claims, 4 Drawing Sheets

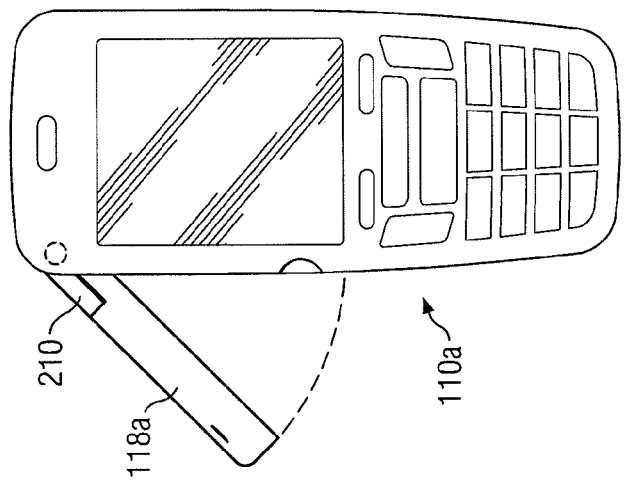
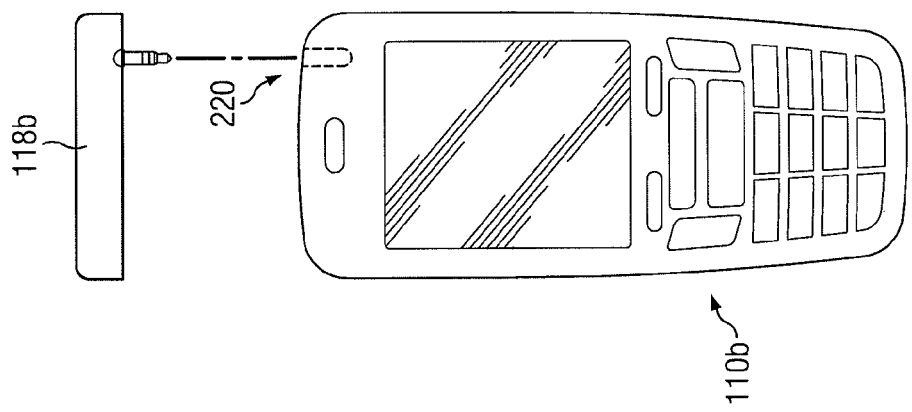
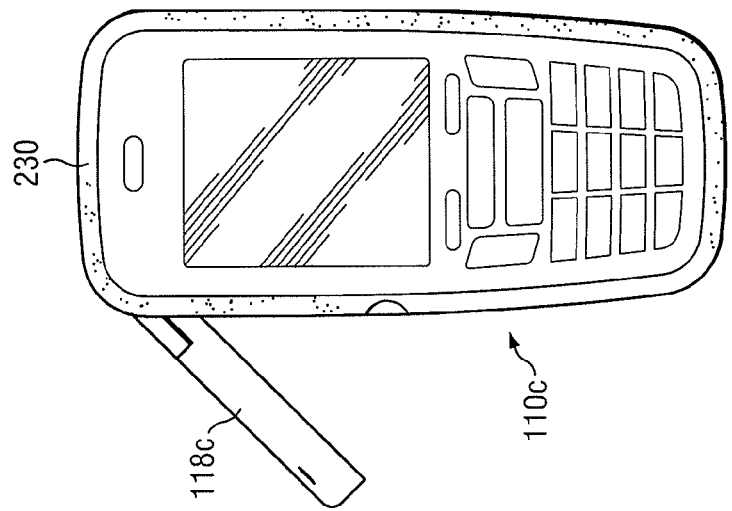

| | Retailer ID 302 | Transaction Amount 304 | Account Number 306 | Expiration Date 308 | Card Verification Value (CVV) 310 | Discretionary Value 312 | Application Authorization Code 314 |
|---|---|---|---|---|---|---|---|
| 316 | RETAILER 1 | $8.32 | 0123 4567 XXXX 1112 | 10/20 | 001 | 000 | LH8F 67U9 7ERT J23Z |
| 318 | RETAILER 2 | $178.02 | 0123 4567 XXXX 1112 | 10/20 | 001 | 000 | XQ4Y 8U92 RC5L 2Y7P |
| 320 | RETAILER 3 | $75.06 | 1314 1516 YYYY 1920 | 10/20 | 001 | 000 | EMNC 5QT3 ANB2 65JT |
| 322 | RETAILER 2 | $15.63 | 2223 2425 ZZZZ 2829 | 10/20 | 024 | 012 | MGR3 GNIC 51ZD SK8R |

AUTHORIZING FINANCIAL TRANSACTIONS

TECHNICAL FIELD OF THE INVENTION

This invention relates generally to financial transactions, and more particularly to authorizing financial transactions involving data stripe readers.

BACKGROUND OF THE INVENTION

Financial accounts (e.g., credit and debit accounts) are often subject to fraudulent transactions. Enterprises employ security measures, such as card verification values (CVV) and personal identification numbers (PIN), to authorize financial transactions, however, these measures are not always sufficient to prevent fraudulent transactions.

SUMMARY OF THE INVENTION

According to embodiments of the present disclosure, disadvantages and problems associated with authorizing financial transactions may be reduced or eliminated.

In certain embodiments, a system for authorizing a financial transaction includes a processor operable to execute an application on a wireless communications device that is communicatively coupled to a data stripe through a wired connection, receive a request to authorize a financial transaction involving a financial account associated with account data, access authorization criteria for determining whether to authorize the financial transaction, apply the authorization criteria to the financial transaction, generate an authorization code based on the application of the authorization criteria to the financial transaction, and communicate the authorization code.

Certain embodiments of the present disclosure may provide one or more technical advantages. In certain embodiments, an application, executed by a processor of a wireless communications device communicatively coupled to a data stripe that communicates account data to a data stripe reader, may enable or disable the data stripe from communicating account data, change the account data communicated by the data stripe, and/or generate an authorization code for a financial transaction. A technical advantage of an embodiment is that the application may require a passcode to be entered through a user interface of the wireless communications device before enabling the data stripe to communicate account data to a data stripe reader, before communicating account data to the data stripe, and/or before generating an authorization code for a financial transaction, thereby providing passcode security to financial transactions. Another technical advantage is that the application may change account data communicated by the data stripe and/or the authorization code for different transactions, thereby preventing malicious entities from using the account data and/or authorization code to make fraudulent transactions. Yet another technical advantage is that the application may receive criteria for authorizing a financial transaction, thereby providing authorized account users and enterprises flexibility in implementing security measures.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 2A-C illustrate embodiments of a wireless communication device communicatively coupled to a data stripe;

FIG. 3 illustrates a table of embodiments of data that may be communicated during a financial transaction.

DETAILED DESCRIPTION OF THE INVENTION

Embodiments of the present invention and its advantages are best understood by referring to FIGS. 1 through 4 of the drawings, like numerals being used for like and corresponding parts of the various drawings.

Figure 1:
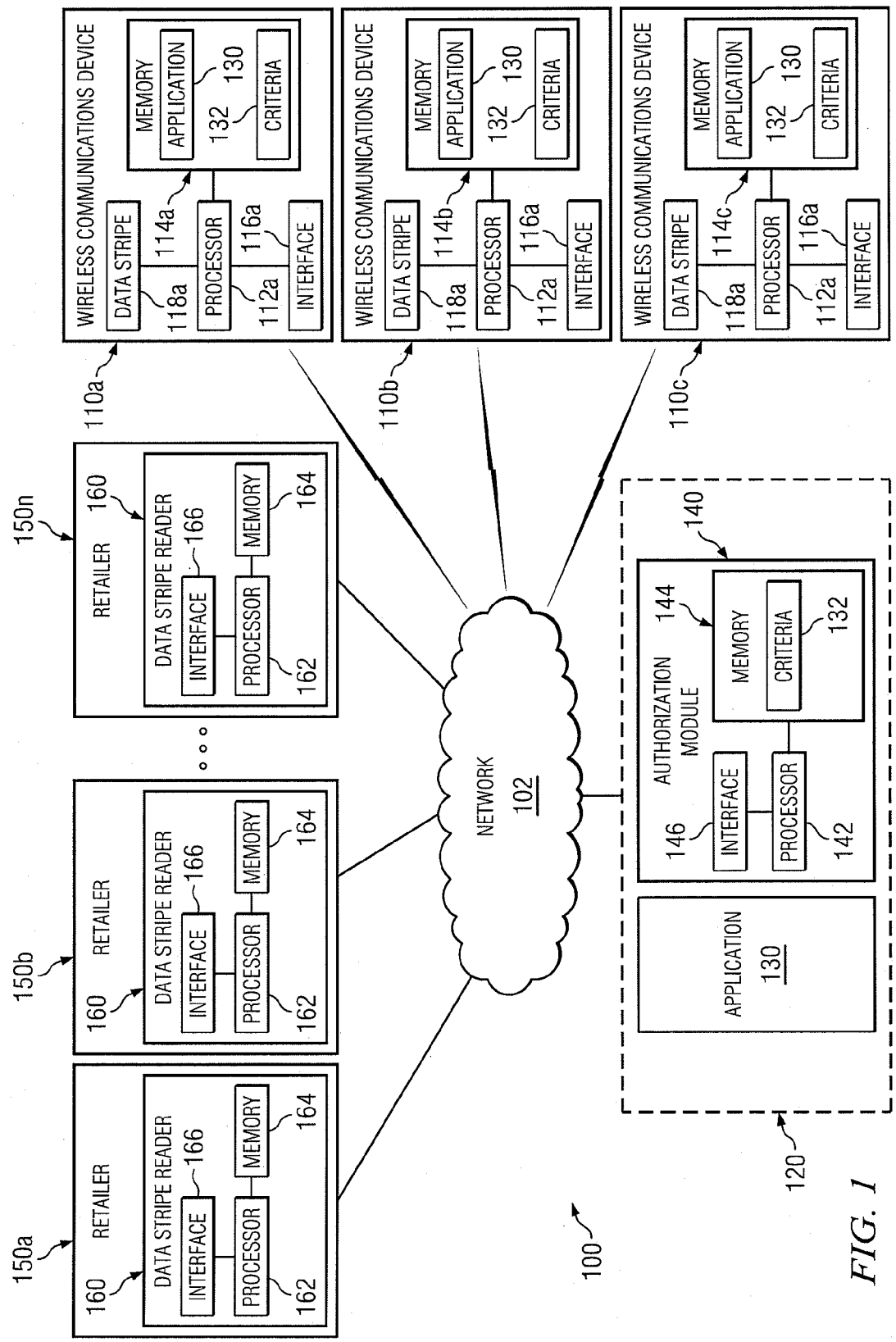
FIG. 1 illustrates a block diagram of an embodiment of a system for authorizing financial transactions.

FIG. 1 illustrates a block diagram of an embodiment of system 100 for authorizing financial transactions. According to an embodiment, system 100 includes network 102, one or more wireless communications devices 110, enterprise 120, and one or more retailers 150. Wireless communications device 110 may include processor 112, memory 114, interface 116, and data stripe 118. Enterprise 120 may include application 130 and authorization module 140, which comprises, processor 142, memory 144, and interface 146. Retailers 150 may include one or more data stripe readers 160 comprising processor 162, memory 164, and interface 166. In an embodiment, one or more wireless communications devices 110, application 130, authorization module 140, and one or more retailer data stripe readers 160 are communicatively coupled to network 102.

According to certain embodiments, application 130 receives a request to authorize a financial transaction involving a financial account associated with data stripe 118 (e.g., a financial account associated with account data accessible by data stripe 118), authorizes the financial transaction, generates an authorization code if application 130 authorizes the financial transaction, and communicates the authorization code. Application 130 may communicate the authorization code to authorization module 140 over network 102 using wireless communications device 110.

Components of system 100, such as wireless communications devices 110, data stripe readers 160, and/or authorization module 140, may include one or more of a processor, a memory, an interface, and logic. A processor represents any computing device, such as processors 112, 142, and 162, configured to control the operation of one or more components of system 100. A processor may comprise one or more processors and may be a programmable logic device, a microcontroller, a microprocessor, any suitable processing device, or any suitable combination of the preceding. A processor includes any hardware and/or software that operates to control and process information received by a component of system 100. In certain embodiments, a processor communicatively couples to other components of system 100, such as a memory (e.g., memories 114, 144, and 164), an interface (e.g., interfaces 116, 146, and 166), a module (e.g., financial services module 140), or any other suitable component.

A memory represents any device, such as memories 114, 144, and 164, operable to store, either permanently or temporarily, data, operational software, or other information for a processor. Memory includes any one or a combination of volatile or non-volatile local or remote devices suitable for storing information. For example, a memory may include random access memory (RAM), read only memory (ROM), magnetic storage devices, optical storage devices, semiconductor storage devices, or any other suitable information storage device or a combination of these devices. A memory may include any suitable information for use in the operation of component of system 100. A memory may further include some or all of one or more databases.

In certain embodiments, memory 114 of wireless communications device 110 includes application 130 and/or authorization criteria 132. Memory 144 of authorization module 140 may also include authorization criteria 132. Authorization criteria 132 may include any suitable criteria that indicates that a financial transaction is authorized by an authorized account user. Authorization criteria 132 may be established by an authorized user of a financial account and/or a financial services provider (e.g., enterprise 120) associated with a financial account.

An interface represents any device, such as interfaces 116, 146, and 166, operable to receive input, send output, process the input and/or output, and/or perform other suitable operations for a component of system 100. An interface includes any port or connection, real or virtual, including any suitable hardware and/or software, including protocol conversion and data processing capabilities, to communicate through network 102. In certain embodiments, an interface includes a user interface (e.g., physical input, graphical user interface, touchscreen, buttons, switches, transducer, or any other suitable method to receive input from a user).

Logic may perform the operation of any component of system 100, for example, logic executes instructions to generate output from input. Logic may include hardware, software, and/or other logic. Logic may be encoded in one or more non-transitory, tangible media, such as a computer-readable medium or any other suitable tangible medium, and may perform operations when executed by a computer and/or processor. Certain logic, such as a processor, may manage the operation of a component.

Network 102 represents any suitable network operable to facilitate communication between components of system 100, such as wireless communications device 110, application 130, authorization module 140, and/or data stripe reader 160. Network 102 may include any interconnecting system capable of transmitting audio, video, electrical signals, optical signals, data, messages, or any combination of the preceding. Network 102 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100.

Wireless communications device 110 represents a device operable to communicate wirelessly over network 102 with components of system 100. In an embodiment, wireless communications device 110 includes processor 112, memory 114, and interface 116. In particular embodiments, wireless communications devices 110 may communicate wirelessly with enterprise 120, application 130, authorization module 140, data stripe reader 160, and/or any other suitable component of system 100. Wireless communication devices 110 may include laptop computers, desktop computers, personal digital assistants (PDAs), mobile phones, tablets, and/or portable media players, or other device capable of wireless communication.

According to certain embodiments, wireless communications device 110 is communicatively coupled to data stripe 118. Data stripe 118 represents a component operable to communicate account data to data stripe reader 160. Data stripes 118 may include magnetic stripes, such as those found on credit or debit cards, dynamic programmable stripes such as those found on dynamic cards, or any other storage medium operable to communicate account data to data stripe reader 160. Account data represents any data that may identify a financial account, identify an authorized user of a financial account, indicate authorization to use a financial account, be utilized in executing a financial transaction involving a financial account, or is otherwise associated with a financial account (e.g., account number, expiration date, card verification value (CVV), pin number, discretionary data, or other data associated with a financial account). In an embodiment, financial accounts associated with account data accessible by data stripe 118 are associated with data stripe 118. Data stripe 118 may be enabled to, or disabled from, communicating account data to data stripe reader 160. In certain embodiments, data stripe 118 communicates different account data for different transactions. Data stripe 118 may further communicate account data associated with a plurality of financial accounts, such as one or more credit, debit, checking, savings, or other financial accounts. In an embodiment, data stripe 118 is a programmable data stripe, wherein the account data communicated by data stripe 118 is dynamic and can be changed at any time.

Enterprise 120 represents an entity that operates application 130 and/or authorization module 140. Enterprise 120 may refer to a financial services provider (e.g., a lender, a bank, a retailer, a credit card company, or any other enterprise 130 that provides financial services), however, enterprise 120 represents any suitable type of entity. Enterprise 120 may have different business units, or subdivisions that handle different business activities. In an embodiment, enterprise 120 includes application 130 and authorization module 140 comprising processor 142, memory 144, and interface 146.

Application 130 represents software operable to execute on wireless communications device 110 that may authorize financial transactions involving a financial account associated with data stripe 118 (e.g., a financial account associated with account data accessible by data stripe 118). Application 130 may execute on wireless communications device 110 from local memory (e.g., memory 114) or from a remote memory location (e.g., a cloud environment). In an embodiment, application 130 is part of enterprise 120 and communicates with authorization module 140 to authorize financial transactions between account users and retailers 150. For example, authorization module 140 may not authorize a financial transaction involving a financial account associated with account data unless application 130 communicates an authorization code to authorization module 140 indicating that application 130 has authorize the transaction.

In certain embodiments, application 130 receives a request to authorize a financial transaction involving a financial account associated with data stripe 118 (e.g., a financial account associated with account data accessible by data stripe 118). A request to authorize represents an indicator that notifies application 130 that a financial transaction involving an account associated data stripe 118 is pending, or that a user of data stripe 118 wants to use data stripe 118 to execute a financial transaction. For example, a request to authorize may include an indicator communicated to application 130 via the user interface of wireless communications device 110 indicating that a user wants to use data stripe 118 to execute a financial transaction. As another example, an indicator is communicated to application 130 from enterprise 120 indicating a financial transaction involving a financial account associated with data stripe 118 is pending. As yet another example, an indicator is communicated to application 130 from a sensor communicatively coupled to wireless communications device 110 or data stripe 118. The indicator indicates data stripe 118 communicated account data to data stripe reader 160, or any other suitable indicator. A request to authorize may occur in response to a pending transaction involving a financial account associated with data stripe 118 and/or in preparation to initiate a transaction a financial account associated with data stripe 118.

In response to a request to authorize, application 130 may access criteria 132 for authorizing a financial transaction. Authorization criteria 132 may include any suitable criteria that indicates that a financial transaction is authorized by an authorized account user. Authorization criteria 132 may be established by an authorized user of a financial account and/or a financial services provider (e.g., enterprise 120) associated with a financial account. Authorization criteria 132 may include a maximum financial transaction amount, where the financial transaction is authorized if the financial transaction amount is below the maximum financial transaction amount. Authorization criteria 132 may further include one or more retailers, where the financial transaction is authorized if it involves the one or more retailers, or one or more locations, where the financial transaction is authorized if the financial transaction occurs within the one or more locations. In certain embodiments, authorization criteria 132 includes criteria for requesting a passcode to authorize a financial transaction.

Application 130 may authorize a financial transaction by requesting a passcode to be communicated through a user interface of wireless communications device 110 (e.g., prompting a wireless communications device user to enter a passcode). Application 130 may receive a passcode through the user interface of wireless communications device 110 and authenticate the received passcode (e.g., verify that the received passcode corresponds to an authorized passcode). A passcode may be a code known only to authorized users of the financial account associated with data stripe 118 (e.g., a pin number), an indicator communicated via a user interface of wireless communications device 110 communicatively coupled to data stripe 118, or any other indicator suitable to indicate to application 130 that an authorized account user approves the financial transaction.

Application 130 may request a passcode to enable data stripe 118 to communicate account data to data stripe reader 160. If application 130 does not receive an authorized passcode, application 130 may disable data stripe 118 by locking it in a physical position such that it cannot be read by data stripe reader 160, by not powering the data stripe, by not communicating account data to data stripe 118, by not communicating an authorization code, or by any other method of disabling data stripe 118 from, or failing to enable data stripe 118, to execute a financial transaction.

Application 130 may authorize the financial transaction in any suitable manner to verify that the financial transaction involves an authorized user of the financial account involved in the financial transaction. Application 130 may authorize the financial transaction by verifying that data stripe 118 is physically located within a maximum distance from wireless communications device 110. For example, application 130 may verify that data stripe 118 is physically connected to wireless communications device 110 (e.g., through an integrated wired connection or through a physical communications port) or communicating with wireless communications device 110 through a short range wireless communications protocol (e.g., Bluetooth®, near field communications (NFC) protocol, or radio frequency identification (RFID) protocol). Application 130 may also authorize a financial transaction by verifying that data stripe 118 has communicated the account data involved in the financial transaction. In certain embodiments, application 130 may verify that data stripe 118 was physically located in the area of the financial transaction at the time of the transaction, for example, by receiving location data (e.g., coordinates from a global positioning system (GPS) sensor, triangulation coordinates from mobile phone towers, data indicating that wireless communications device 110 was communicated with a network component with a known location such as a wireless router or mobile communications tower, or any other data operable to determine the location of wireless communications device 110 and/or data stripe 118).

Application 130 may additionally change the account data communicated by data stripe 118 to data stripe reader 160 for different transactions. For example, application 130 may change account number, expiration date, card verification value (CVV), discretionary data, and/or other data. In an embodiment, application 130 may change the data communicated by data stripe 118 for every transaction, for transactions at different retailers 150, for transactions in different locations, or for any other suitable reason. Application 130 may further communicate account data to data stripe 118 associated with a plurality of different financial accounts.

Authorization module 140 represents a component of system 100 that authorizes financial transactions involving a financial account associated with account data accessible by data stripe 118. Authorization module 140 includes processor 142, memory 144, and interface 146. Authorization module 140 may authorize financial transactions based on criteria 132 established by enterprise 120 and/or an authorized financial account user. Authorization module 140 may perform the functions of an acquirer, a credit or debit card network, and/or a credit or debit card issuer (e.g., enterprise 120). In certain embodiments, a financial transaction cannot be completed until authorization module 140 authorizes the transaction. In an embodiment, whether authorization module 140 receives an authorization code from application 130 is criteria 132 considered by authorization module 140 in determining whether to authorize the financial transaction.

In some embodiments, authorization module 140 may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of authorization module 140 may be performed by any suitable combination of one or more servers or other components at one or more locations. In an embodiment where authorization module 140 is a server, the server may be a private server, and the server may be a virtual or physical server. Additionally, authorization module 140 may include any suitable component that functions as a server.

Retailers 150 represent entities that offer goods and/or services for a user to purchase, rent, lease, buy, or otherwise acquire. Retailer 150 may include a retailer, a wholesaler, a service company, or any other suitable entity that has customers and conducts transactions with the customers. Retailer 150 includes one or more data stripe readers 160 comprising processor 162, memory 164, and interface 166. Data stripe reader 160 represents a device operable to receive account data from data stripes 118, such as a point-of-sale magnetic stripe reader, or other device operable to facilitate a financial transaction between a retailer 150 and a financial account user.

In an exemplary embodiment of operation, wireless communications device 110 is communicatively coupled to data stripe 118. Data stripe 118 may be operable to communicate account data (e.g., credit card number, debit card number, expiration date, card verification value, pin number, discretionary data, or other data relating to a financial account) to one or more data stripe readers 160 at retailer 150. In the embodiment, wireless communication device 110 is operable to execute application 130. Application 130 may receive a request to authorize a financial transaction involving a financial account (e.g., credit or debit account) associated with data stripe 118. In response to a request to authorize, application 130 may authorize the financial transaction in any suitable manner, such as those discussed above. If application 130 authorizes the financial transaction, application 130 may generate an approved authorization code indicating application 130 was able to authorize the financial transaction, and communicate the authorization code to authorization module 140. If application 130 is not able to authorize the financial transaction, application 130 may communicate an unapproved authorization code indicating that application 130 was not able to authorize the financial transaction, or application 130 may not communicate any indicator.

In certain embodiments, application 130 changes the approved authorization code and/or unapproved authorization code based on the transaction. For example, application 130 may communicate different codes for every transaction, for different retailers 150, for different locations, or any other suitable criteria. In certain embodiments, application 130 communicates approved and/or unapproved authorization codes to authorization module 140 over network 102. Application 130 may utilize wireless communications device 110 and/or data stripe 118 to wirelessly communicate an authorization code. Application 130 may communicate an authorization code to authorization module 140, or application 130 may communicate an authorization code using data stripe 118 to data stripe reader 160, which may communicate the authorization code to authorization module 140.

Modifications, additions, or omissions may be made to system 100. System 100 may include more, fewer, or other components. Any suitable component of system 100 may include a processor, interface, logic, memory, and/or other suitable element.

FIGS. 2A-C illustrate embodiments of wireless communication device 110 communicatively coupled to data stripe 118. FIG. 2A illustrates wireless communications device 110a. Wireless communications device 110a communicates with data stripe 118a via wired connection 210. Wired connection 210 represents physical communications or power connection from wireless communications device 110a to data stripe 118a (e.g., integrated circuitry, fiber optic, electrical connection, or other physical communications or power connection). Wired connection 210 may be enclosed in a housing of wireless communications device 110a and/or data stripe 118a. Wired connection 210 may include wired communications port 220.

FIG. 2B illustrates wireless communications device 110b. Wireless communications device 110b communicates with data stripe 118b via a coupling of data stripe 118b to wired communications port 220 of wireless communications device 110b. Wired communications port 220 represents a physical communications or power connection of wireless communications device 110b operable to detachably receive a wired communications or power connection (e.g., integrated circuitry, fiber optic, electrical connection, or other physical communications or power connection). Wired communications port 220 may include a headphone port, USB port, electrical charging port, or any other physical port operable to detachably receive a wired communications connection.

FIG. 2C illustrates wireless communications device 110c. Wireless communications device 110c communicates with data stripe 118c via a security enabled wireless communication protocol via wireless communications port 230 of wireless communications device 110c. Wireless communications port 230 represents a wireless communications port of wireless communications device 110c operable to wirelessly communicate with an external wireless device, for example data stripe 118c, using a security enabled protocol. A security enabled protocol may include any type of encryption, short range communications protocol (e.g., near field communication (NFC), radio frequency identification (RFID), or other short range communications protocol with an effective range small enough to prevent communicated data from being intercepted). In certain embodiments, data stripe 118c may be included in a housing for wireless communications device 110c (e.g., a protective and/or decorative case).

Modifications, additions, or omissions may be made to wireless communication devices 110 and/or data stripes 118. Data stripe 118 may pivotably attach to wireless communications device 110 such that data stripe 118 may pivot relative to communications device 110 (e.g., a "switchblade" configuration), slidably attach to wireless communications device 110 such that data stripe 118 may slide relative to wireless communications device 110, hingeably attach to wireless communications device 110 such that data stripe 118 may hinge relative to wireless communications device 110, and/or attach in any other suitable configuration such that data stripe 118 may be positioned to be read by data stripe reader 160. In certain embodiments, data stripe 118 may not move relative to wireless communications device 110.

FIG. 3 illustrates table 300 of embodiments of data that may be communicated between components of system 100 during a financial transaction. Table 300 includes retailer ID column 302, transaction amount column 304, account number column 306, expiration date column 308, card verification value (CVV) column 310, discretionary data column 312, and application authorization code column 314.

Retailer ID column 302 represents an identification code that identifies retailer 150 involved in the financial transaction. Transaction amount column 304 represents the monetary amount involved in the financial transaction. Account number column 306 represents an identification code for a financial account associated with data stripe 118. Expiration date column 308 represents an expiration date associated with the account number. CVV column 310 represents a card verification value associated with the account number. Discretionary data column 312 represents data stored on data stripe 118 that may be used for any purpose. In an embodiment, discretionary data is stored in excess storage capacity of data stripe 118. For example, data stripe 118 may be operable to store 79 character values, but may only have 70 character values worth of non-discretionary account data to store. Discretionary data may fill the remaining 9 character values of data on data stripe 118. Application authorization code column 314 represents an authorization code communicated by application 130 if application 130 authorizes a financial transaction.

Rows 316, 318, 320, and 322 represent embodiments of data (e.g., account data) communicated by components of system 100 as part of financial transactions.

In the financial transaction represented at row 316, data stripe 118 communicates account number (0123 4567 XXXX 1112), expiration date (10/20), CVV (001), and discretionary data (000) to data stripe reader 160 of retailer 150 as part of a financial transaction, and retailer 150 communicates data received from data stripe 118, retailer ID (Retailer 1), and transaction amount ($8.32) over network 102. Application 130 may wirelessly communicate application authorization code (LH8F 67U9 7ERT J23Z) using wireless communications device 110 to authorization module 140 or data stripe reader 160. In an embodiment, retailer 150 and application 130 communicate data to authorization module 140. Authorization module 140 may use the received data as part of an authorization process to determine whether to authorize the financial transaction (e.g., whether to guarantee payment to retailer 150 of the transaction amount).

In the transaction represented at row 318, application 130 communicates a different authorization code (XQ4Y 8U92 RC5L 2Y7P) than in the transaction at row 316. Application 130 can provide increased security by changing the authorization code for different transactions, thereby preventing entities who may intercept the authorization code from using it to make fraudulent transactions.

In certain embodiments, data stripe 118 may be a programmable data stripe, and may receive account number, expiration date, CVV, discretionary data, or other data from application 130. Application 130 may change this data based on the transaction. In the transaction represented at row 320, application 130 changes the account number (1314 1516 YYYY 1920) communicated by data stripe 118 to data stripe reader 160 and changes the authorization code (EMNC 5QT3 ANB2 65JT) communicated by application 130. Application 130 may change any data communicated by data stripe 118. For example, in the transaction represented by row 322, application 130 changes the account number (2223 2425 ZZZZ 2829), CVV (024), and discretionary data (012) communicated by data stripe 118 to data stripe reader 160, as well as changes the authorization code (MGR3 GNIC 51 ZD SK8R). By implementing multiple layers of security measures (e.g., requiring a passcode to communicate an authorization code, and changing account data communicated by data stripe 118 for different transactions), application 130 may increase the security of financial transactions involving financial accounts associated with data stripe 118.

Modifications, additions, or omissions may be made to data communicated during a financial transaction. More, fewer, or other data may be communicated during a financial transaction. Application 130 may change data communicated by application 130 (e.g., authorization code, account number, expiration date, CVV, and/or discretionary data) for every transaction, for different retailers, for different transaction amounts, or any other suitable criteria.

Figure 4:
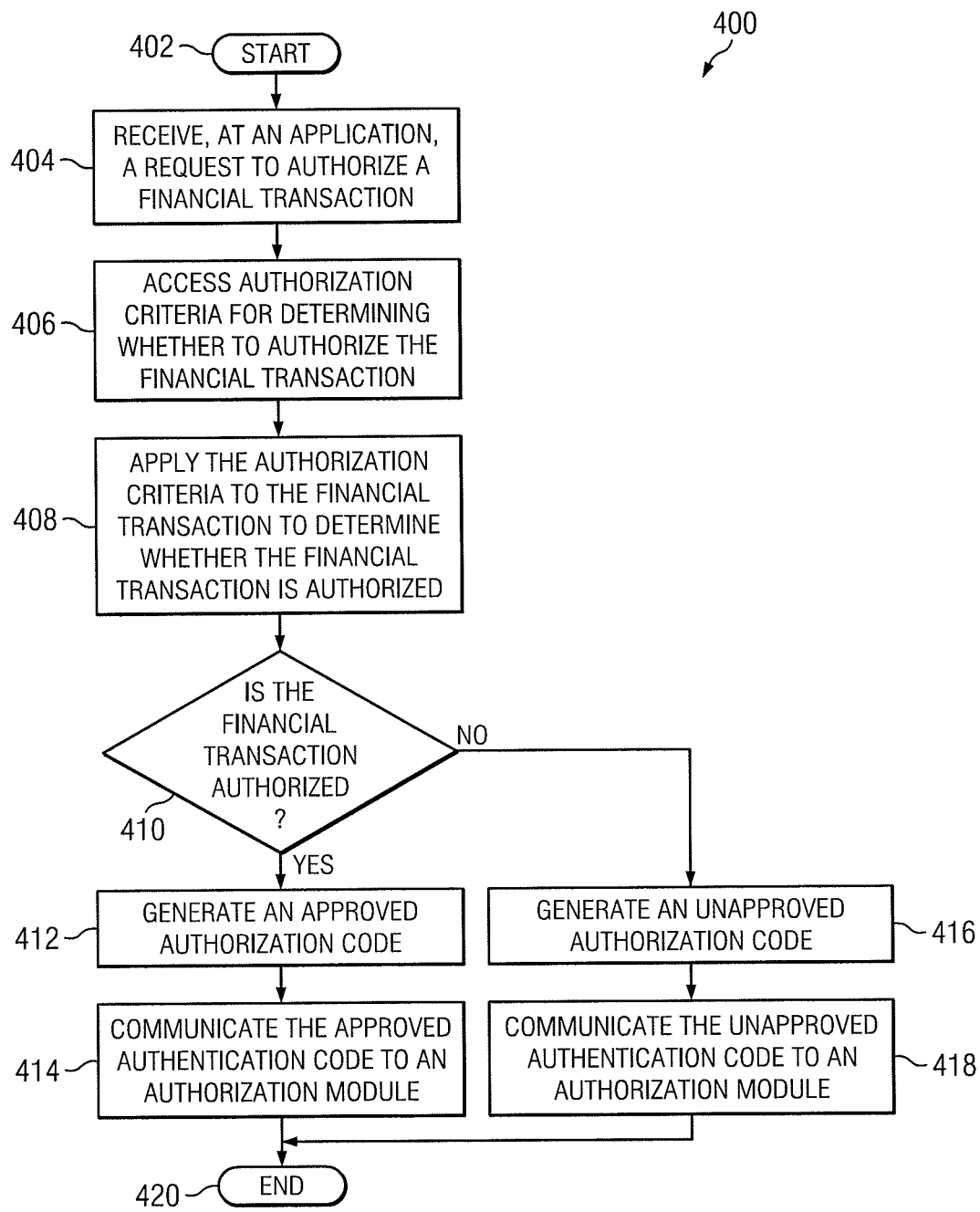
FIG. 4 illustrates a method for authorizing financial transactions.

FIG. 4 illustrates a method 400 of authorizing financial transactions. Method 400 begins at step 402. At step 404, application 130 receives a request to authorize a financial transaction. At step 406, application 130 accesses authorization criteria 132 for determining whether to authorize the financial transaction. Authorization criteria 132 may be stored in local memory 114 of wireless communications device 110, or may be stored remote from wireless communications device 110, such as in memory 144 of authorization module 140. At step 408, application 130 applies the authorization criteria 132 to the financial transaction to determine whether the financial transaction is authorized. At step 410, application 130 determines whether the financial transaction is authorized. If the financial transaction is authorized, the method moves to step 412 and application 130 generates an approved authorization code, and the method moves to step 414 and application 130 communicates the approved authorization code to authorization module 140. If the financial transaction is not authorized, the method moves to step 416 and application 130 generates an unapproved authorization code indicating that application 130 was not able to authorize the financial transaction, and the method moves to step 418 and application 130 communicates the unapproved authorization code to authorization module 140. In an embodiment, application 130 may not generate or communicate any authorization code if the financial transaction is not authorized. In certain embodiments, application 130 changes the approved and/or unapproved authorization codes based on the transaction. For example, application 130 may generate different codes for every transaction, for different retailers, for different locations, or any other suitable criteria. At step 420 the method ends.

Modifications, additions, or omissions may be made to method 400. The method may include more, fewer, or other steps. Additionally, steps may be performed in any suitable order. Any suitable component of system 100 may perform one or more steps of method 400.

Certain embodiments of the present disclosure may provide one or more technical advantages. In certain embodiments, application 130 may enable or disable data stripe 118 from communicating account data, change the account data communicated by data stripe 118, and/or generate an authorization code for a financial transaction. A technical advantage of an embodiment is that application 130 may require a passcode to be entered through a user interface of wireless communications device 110 before enabling data stripe 118 to communicate account data to data stripe reader 160, before communicating account data to data stripe 118, and/or before generating an authorization code for a financial transaction, thereby providing passcode security to financial transactions. Another technical advantage is that application 130 may change account data communicated by data stripe 118 and/or authorization codes for different transactions, thereby preventing entities from using the account data and/or authorization codes to make fraudulent transactions. Yet another technical advantage is that application 130 may receive criteria 132 for authorizing a financial transaction, thereby providing authorized account users and enterprises 120 flexibility in implementing security measures.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A system for authorizing a financial transaction, comprising:
   an interface operable to receive a request to authorize a first financial transaction involving a financial account associated with a plurality of account data; and
   a processor, communicatively coupled to the interface, executing an application on a wireless communications devices that is communicatively coupled to a data stripe through a wired connection, operable to:
   access authorization criteria for determining whether to authorize the first financial transaction;
   apply the authorization criteria to the first financial transaction;
   generate an authorization code based on successful application of the authorization criteria to the first financial transaction, wherein the interface is operable to communicate the authorization code; and
   enable the data stripe to communicate a first account data from the plurality of account data associated with the financial account to a data stripe reader based on the successful application of the authorization criteria to the first financial transaction, wherein the first account data communicated to the data stripe reader is changed for each of a plurality of subsequent financial transactions, and the first account data comprises one or more of an account number and a card verification value.

2. The system of claim 1, wherein receiving a request to authorize comprises receiving at least one from the set comprising:
a first indicator that indicates a user of the data stripe desires to use the data stripe to execute a financial transaction; and
a second indicator that indicates a financial transaction involving a financial account associated with the data stripe is pending.

3. The system of claim 1, the processor further operable to request a passcode to facilitate authorization of the financial transaction; and
the interface further operable to receive the passcode that facilitates authorization of the financial transaction, wherein the processor is operable to authenticate the received passcode.

4. The system of claim 1, wherein the authorization criteria include at least one from the set comprising:
a maximum financial transaction amount, wherein the transaction is authorized if a financial transaction amount is below the maximum financial transaction amount;
one or more retailer identifiers, wherein the transaction is authorized if the financial transaction involves the one or more retailer identifiers; and
one or more locations, wherein the transaction is authorized if the financial transaction occurs within the one or more locations, 5. The system of claim 1, the interface further operable to communicate a different authorization code for a different financial transaction.

6. The system of claim 1, wherein the authorization code is a selected one of:
an approved authorization code if the financial transaction is authorized; and
an unapproved authorization code if the financial transaction is not authorized.

7. The system of claim 1, wherein the wired connection to the data stripe is a wired connection that detachably connects the wireless communications device to the data stripe and is one or more from the set comprising:
a wired connection to a detachable protective case for the wireless communications device, wherein protective case comprises the data stripe:
a wired connection that enables the data stripe to slide relative to the wireless communications device; and
a wired connection that enables the data stripe to hinge relative to the wireless communications device.

8. The system of claim 1, wherein the authorization criteria is established by at least one from the set comprising:
a financial institution associated with the financial account; and
an authorized user of the financial account.

9. A non-transitory computer readable medium comprising logic for authorizing a financial transaction, the logic, when executed by a processor, operable to:
receive, at an application of a wireless communications device that is communicatively coupled to a data stripe through a wired connection, a request to authorize a first financial transaction involving a financial account associated with a plurality of account data;
access, by the application, authorization criteria to determine whether to authorize the financial transaction;
apply, by the application, the authorization criteria to the first financial transaction;
generate, by the application, an authorization code based on successful application of the authorization criteria to the first financial transaction; and
communicate, from the application, the authorization code; and
enable the data stripe to communicate a first account data from the plurality of account data associated with the financial account to a data stripe reader based on the successful application of the authorization criteria to the first financial transaction, wherein the first account data communicated to the data stripe reader is changed for each of a plurality of subsequent financial transactions, and the first account data comprises one or more of an account number and a card verification value.

10. The computer readable medium of claim 9, wherein receiving a request to authorize comprises receiving at least one from the set comprising
a first indicator that indicates a user of the data stripe desires to use the data stripe to execute a financial transaction; and
a second indicator that indicates a financial transaction involving a financial account associated with the data stripe is pending.

11. The computer readable medium of claim 9, the logic further operable to:
request, by the application, a passcode to facilitate authorization of the financial transaction;
receive, at the application, the passcode that facilitates authorization of the financial transaction; and
authenticate, by the application, the received passcode.

12. The computer readable medium of claim 9, wherein the authorization criteria include at least one from the set comprising:
a maximum financial transaction amount, wherein the transaction is authorized if a financial transaction amount is below the maximum financial transaction amount;
one or more retailer identifiers, wherein the transaction is authorized if the financial transaction involves the one or more retailer identifiers; and
one or more locations, wherein the transaction is authorized if the financial transaction occurs within the one or more locations.

13. The computer readable medium of claim 9, the logic further operable to enable, by the application, the data stripe to be operable to communicate account data to a data stripe reader.

14. The computer readable medium of claim 9, the logic further operable to communicate a different authorization code for a different financial transaction.

15. The computer readable medium of claim 9, wherein the authorization code is a selected one of:
an approved authorization code if the financial transaction is authorized by the application; and
an unapproved authorization code if the financial transaction is not authorized by the application.

16. The computer readable medium of claim 9, wherein the wired connection to the data stripe is a wired connection that detachably connects the wireless communications device to the data stripe and is one or more from the set comprising:
a wired connection to a detachable protective case for the wireless communications device, wherein the protective case comprises the data stripe;

a wired connection that enables the data stripe to slide relative to the wireless communications device; and a wired connection that enables the data stripe to hinge relative to the wireless communications device.

17. The computer readable medium of claim 9, wherein the authorization criteria is established by at least one from the set comprising:

a financial institution associated with the financial account; and an authorized user of the financial account.

18. A method for authorizing a financial transaction, comprising:

receiving, at an application executed by a processor of a wireless communications device that is communicatively coupled to a data stripe through a wired connection, a request to authorize a first financial transaction involving a financial account associated with a plurality of account data;

accessing authorization criteria to determine whether to authorize the first financial transaction;

applying, by the processor, the authorization criteria to the financial transaction;

generating, by the processor, an authorization code based on successful application of the authorization criteria to the first financial transaction;

communicating the authorization code; and enabling the data stripe to communicate a first account data from the plurality of account data associated with the financial account to data stripe reader based on the successful application of the authorization criteria to the first financial transaction, wherein the first account data communicated to the data stripe reader is changed for each of a plurality of subsequent financial transactions, and the first account data comprises one or more of an account number and a card verification value.

19. The method of claim 18, wherein receiving a request to authorize comprises receiving at least one from the set comprising:

a first indicator that indicates a user of the data stripe desires to use the data stripe to execute a financial transaction; and a second indicator that indicates a financial transaction involving a financial account associated with the data stripe is pending.

20. The method of claim 18, further comprising requesting, by the application, a passcode to facilitate authorization of the financial transaction;

receiving, at the application, the passcode that facilitates authorization of the financial transaction; and authenticating, by the application, the received passcode.

21. The method of claim 18, wherein the authorization criteria include at least one from the set comprising:

a maximum financial transaction amount, wherein the transaction is authorized if a financial transaction amount is below the maximum financial transaction amount;

one or more retailer identifiers, wherein the transaction is authorized if the financial transaction involves the one or more retailer identifiers; and one or more locations, wherein the transaction is authorized if the financial transaction occurs within the one or more locations.

22. The method of claim 18, further comprising, enabling, by the application, the data stripe to be operable to communicate account data to a data stripe reader.

23. The method of claim 18, further comprising communicating a different authorization code for a different financial transaction.

24. The method of claim 18, wherein the authorization code is a selected one of:

an approved authorization code if the financial transaction is authorized by the application; and an unapproved authorization code if the financial transaction is not authorized by the application.

25. The method of claim 18, wherein the wired connection to the data stripe is a wired connection that detachably connects the wireless communications device to the data stripe and is one or more from the set comprising:

a wired connection to a detachable protective case for the wireless communications device, wherein protective case comprises the data stripe;

a wired connection that enables the data stripe to slide relative to the wireless communications device; and a wired connection that enables the data stripe to hinge relative to the wireless communications device.

26. The method of claim 18, wherein the authorization criteria is established by at least one from the set comprising:

a financial institution associated with the financial account; and an authorized user of the financial account.

* * * * *